May 1, 1962     R. J. LIPSITZ     3,031,921
PHOTOGRAPHIC LIGHT METERS
Filed Oct. 14, 1958     2 Sheets-Sheet 1
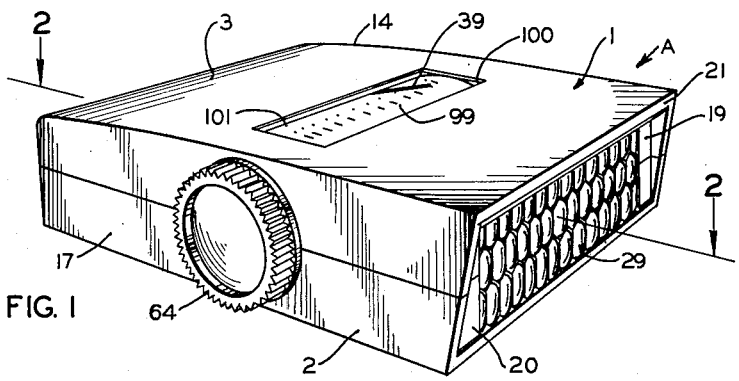
FIG. 1
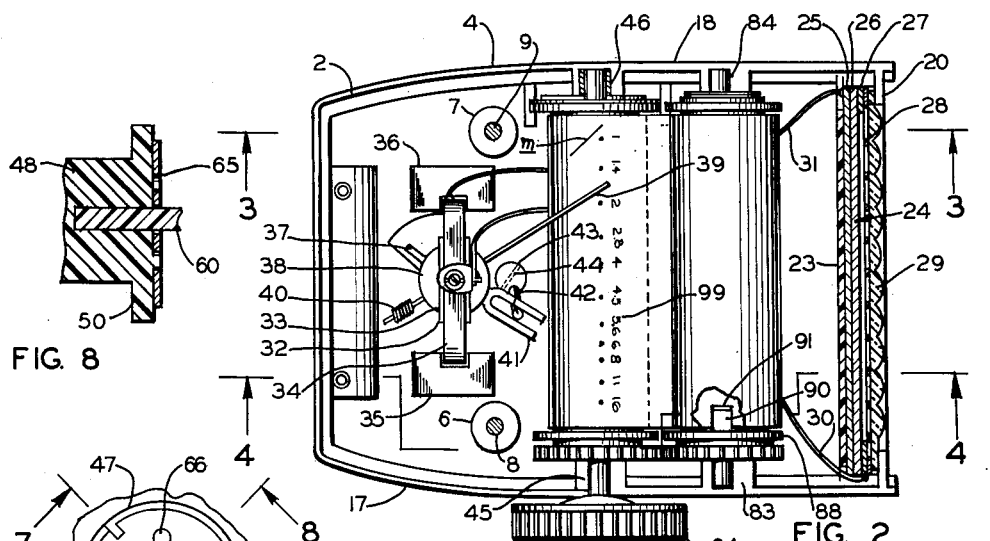
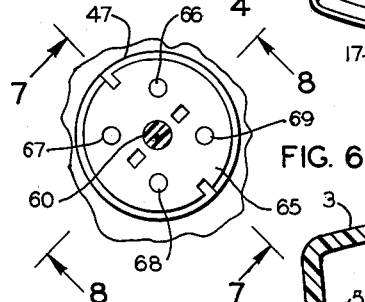
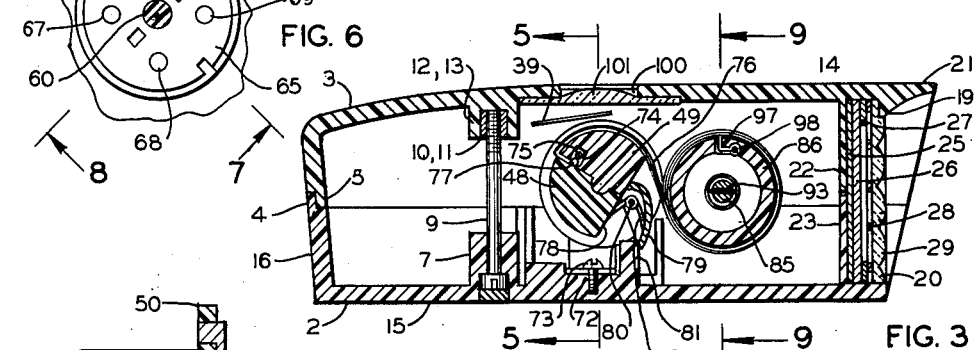
INVENTOR.
ROBERT J. LIPSITZ
BY Alfred W. Petchaft
ATT'Y.

May 1, 1962

R. J. LIPSITZ 3,031,921

PHOTOGRAPHIC LIGHT METERS

Filed Oct. 14, 1958

INVENTOR.
ROBERT J. LIPSITZ
BY
Alfred W Petchaft
ATT'Y.

Patented May 1, 1962

3,031,921
PHOTOGRAPHIC LIGHT METERS
Robert J. Lipsitz, Ladue, Mo., assignor to Kalimar, Inc., St. Louis, Mo., a corporation of Missouri
Filed Oct. 14, 1958, Ser. No. 767,115
4 Claims. (Cl. 88—23)

This invention relates to certain new and useful improvements in photographic light meters.

It is the primary object of the present invention to provide a photographic light meter having a plurality of scales corresponding to a wide range of film speeds, any one of which can be readily preselected for use with a galvanometer within the light meter so that the proper camera aperture opening can be readily obtained by a direct reading of the position of the galvanometer needle on the preselected scale.

It is a further object of the present invention to provide a light meter of the type stated wherein the scales are imprinted on a long narrow strip of material adapted to be wrapped around a pair of adjacent driven rollers so that the strip may be moved in either of two directions for purposes of preselecting a scale.

It is another object of the present invention to provide a light meter of the type stated wherein tension in the strip is maintained so that the strip will always remain snugly trained around the rollers.

It is also an object of the present invention to provide a light meter of the type stated which forms a relatively compact assembly.

It is an additional object of the present invention to provide a light meter of the type stated wherein the strip will always be trained around the rollers in the same direction irrespective of which direction the strip is traveling.

It is still another object of the present invention to provide a light meter of the type stated wherein the galvanometer needle may be readily counterbalanced prior to final assembly of the light.

With the above and other objects in view, my invention resides in the novel features of form, construction, arrangement, and combination of parts presently described and pointed out in the claims.

In the accompanying drawings—

FIG. 1 is a perspective view of a photographic light meter constructed in accordance with and embodying the present invention;

FIG. 2 is a sectional view taken along line 2—2 of FIG. 1;

FIG. 3 is a sectional view taken along line 3—3 of FIG. 2 and showing the strip in its farthest position of travel in one direction;

FIG. 6 is a sectional view taken along line 6—6 of FIG. 5;

FIGS. 7 and 8 are fragmentary sectional views taken along lines 7—7, 8—8, respectively, of FIG. 6;

Figure 4:
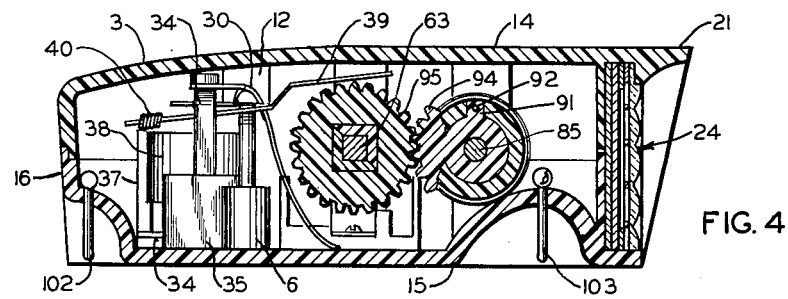
FIG. 4 is a sectional view taken along line 4—4 of FIG. 2.

Referring now in more detail and by reference characters to the drawings which illustrate a practical embodiment of the present invention, A designates a photographic light meter comprising a case 1 which is horizontally split in the provision of a base 2 and a companion cap 3, each preferably being formed of molded plastic, such as a phenolformaldehyde resin. The upwardly presented marginal flange 4 of the base 2 and the downwardly presented flange 5 of the cap 3 abut each other to provide matching surfaces, and the base 2 is integrally provided with spaced upstanding sleeves 6, 7, for receiving screws 8, 9. The screws 8, 9, are threaded into metallic sleeves 10, 11, which are aligned with the sleeves 6, 7, and are mounted in depending bosses 12, 13, the latter being integrally formed on the cap 3. Thus, when the base 2 and cap 3 are assembled the case 1 will be formed with a top wall 14, a bottom wall 15, a back wall 16, and spaced side walls 17, 18. Formed on the forwardly presented ends of the base 2 and cap 3 are cooperating marginal flanges 19, 20, the flange 19 being provided with a forwardly extending shade 21. Also formed on the cap 3 in rearwardly spaced relation to the flange 19 is a depending wall 22 which is vertically aligned with and preferably contacts an upstanding companion wall 23 formed on the base 2.

Mounted adjacent the aligned walls 22, 23, is a conventional photoelectric cell 24 which consists of an electrically conductive backing plate 25 and a companion-shaped cathode plate 26, the latter being coated on its outwardly presented face with a suitable photosensitive material. Positioned against the cathode plate 26 and extending marginally therearound is an electrically conductive anode ring 27 and disposed adjacent the anode ring 27 is a foraminous screen 28. Interposed between the flanges 19, 20, and foraminous screen 28 is a transparent beaded-light-diffusing disc 29 which allows light passing therethrough to be diffused prior to striking the coated face of the cathode plate 26.

Connected to the plate 25 and ring 27 are wires 30, 31, which are, in turn, connected to the opposite ends of a movable galvanometer coil 32. The galvanometer coil 32 is wound around a ring 33 which is supported for rotation about a vertical axis in a yoke 34, the latter, in turn, being mounted in upstanding supports 35, 36, which are formed on the bottom wall 15. Rigidly mounted on the yoke 34 and extending upwardly therefrom is an arm 37 which rigidly holds a permanent magnet 38 within the confines of the ring 33. Rigidly connected to and extending outwardly from the ring 33 is a galvanometer needle 39, one end of which is provided with a small metallic counterbalancing coil 40. In assembling the galvanometer the coil 40 may be slipped over the end of the needle 39 at its proper position of adjustment whereupon the coil 40 may be crimped, soldered, or otherwise rigidly secured in position. Also rigidly connected to the ring 33 is a bifurcated zero adjustment arm 41 which receives an upstanding pin 42 mounted on the periphery of a zero adjustment screw 43. The zero adjustment screw 43 is rotatable in the bottom wall 15, and is provided with an exposed slot 44 so that a suitable screw driver may be used to rotate same.

Figure 5:
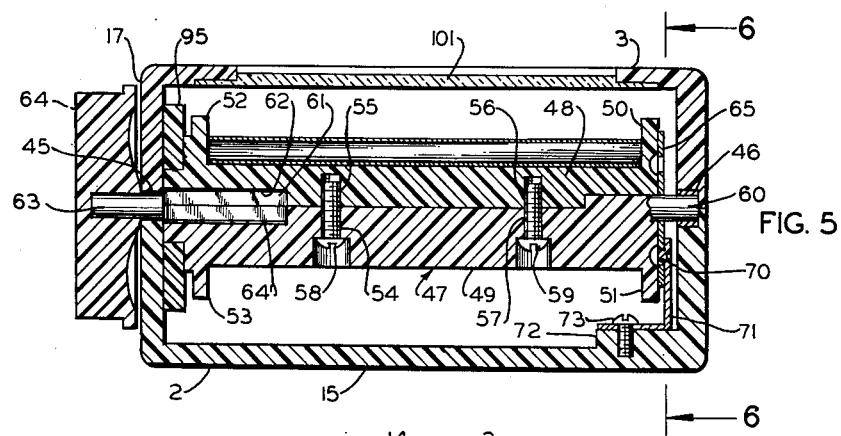
FIG. 5 is a sectional view taken along line 5—5 of FIG. 3.
Figure 9:
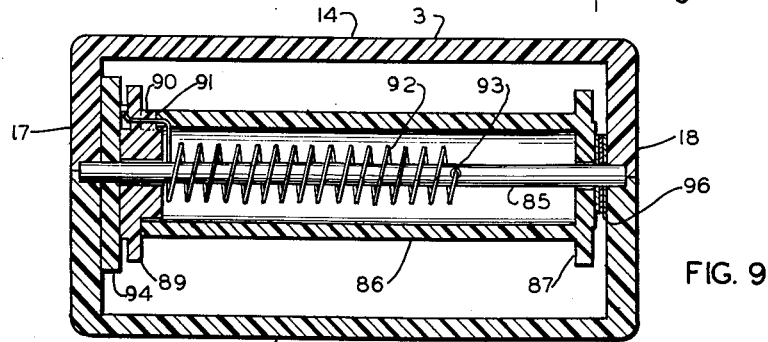
FIG. 9 is a sectional view taken along line 9—9 of FIG. 3.

Formed in the side walls 17, 18, are aligned bearings 45, 46, for rotatably supporting a roller 47 which is longitudinally split into two companion sections 48, 49, the roller sections 48, 49, are each provided with aligned end flanges 50, 51, 52, 53. The roller sections 48, 49, are also each provided with aligned diametrally extending holes 54, 55, 56, 57, for receiving screws 58, 59, which rigidly secure the sections 48, 49, together. The roller section 49 integrally includes a shaft portion 60 which extends axially of the roller 47 at one end thereof and is rotatable in the bearing 46. At its other end, the roller 47 is provided with an axial bore 61, preferably of rectangular cross-section, which lies in part in each of the roller sections 48, 49, and is adapted to receive the companion-shaped end 62 of a knob shaft 63, which rotates in the bearing 45 and projects outwardly through the side wall 17 for rigidly supporting a knob 64. If desired, a small strip of flexible plastic 64' may be wrapped around the end 62 as shown in FIG. 5 so that the end 62 is held firmly and retentively within the bore 61.

Rigidly mounted on the roller 47 adjacent the end flanges 50, 51, is an annular disc 65 which is preferably provided with four equally spaced holes 66, 67, 68, 69, any one of which is adapted to receive an inwardly extending catch-forming protuberance 70 formed on the upper end of a resilient arm 71. The arm 71 extends downwardly below the roller 47 and is secured to a shoulder 72 on the bottom wall 15 by means of a mounting screw 73. Consequently, as the roller 47 is rotated by movement of the knob 64, the catch-forming protuberance 70 successively snaps into each of the holes 66, 67, 68, 69, but if the knob 64 is released while the protuberance 70 is engaged in one of the holes 66, 67, 68, 69, the roller 47 will be held immovably in such position.

Mounted in a lengthwise extending groove 74 in the roller section 49 is a wire 75 which is rigidly secured to one transverse end of a strip 76 of plastic or plastic coated paper, and clamped against the wire 75 is a tongue 77 which is formed on the roller section 48. As best seen in FIG. 3 the strip 76 extends between the roller sections 48, 49, and is wrapped around the roller 47 so as to be confined between the flanges 50, 51 52, 53. Adjacent the flanges 50, 51, the roller 47 is cut away or otherwise formed in the provision of a flat portion 78 for receiving an arcuate cup-like stop member 79 which is rockable on a rod 80, the latter being clamped between the roller sections 48, 49. Encircling the rod 80 and bearing against the flat portion 78 and stop member 79 is a spring 81 which, when the roller 47 and strip 76 are in the position shown in FIG. 3, biases the stop member 79 outwardly for engagement with a stop abutment 82, the latter being formed on and projecting upwardly from the bottom wall 15.

Rotatably mounted in forwardly spaced parallel relation to the roller 47 and journaled in bearings 83, 84, is a shaft 85 having a hollow roller 86 rotatable thereon, the roller 86 being provided on one end with a flange 87 and on its other end with an end cap 88. The end cap 88 is also rotatable on the shaft 85 and includes a peripheral flange 89 and an axial projection 90 which fits into a notch 91 on the roller 86 so that the end cap 88 is constrained against rotation with respect to the roller 86. Encircling the shaft 85 within the roller 86 is a coil spring 92 which is anchored at one end in a hole 93 on the shaft 85, and the other end of the spring 92 projects into and is embedded in the end cap 88 at the projection 90 thereon. Rigidly mounted on the shaft 85 adjacent the end cap 88 is a spur gear 94 which meshes with a similar spur gear 95 rigidly mounted on the roller 47 adjacent the side wall 17. If desired, a plurality of spacer washers 96 may be mounted on the shaft 85 adjacent the flange 87. At its outer periphery the roller 86 is provided with a longitudinal extending slit 97 for receiving an anchoring rod 98 around which the other end of the strip 76 is wrapped. If desired, a suitable adhesive may be applied at the slit 97 so as to firmly secure the rod 98 and end of the strip 76 in place. The strip 76 is wrapped around the roller 86 oppositely to the direction in which the strip is wrapped around the roller 47.

As seen by reference to FIGS. 1 and 2, one surface of the strip 76 has a plurality of spaced parallel scales 99 imprinted thereon, any one of which may be viewed through an opening 100 in the top wall 14, the opening 100 preferably being suitably covered by a transparent plate 101 cemented or otherwise secured to the underside of the top wall 14. The scales 99 are, furthermore, calibrated in terms of camera aperture openings and/or EV settings should the meter A be used with cameras having its shutter coupled with its iris. Each scale 99 is calibrated for use with a particular type of film having a known film speed rating. The spacing of the scales 99 is such that any selected scale 99 will be in vertical registration with the opening 100 when the protuberance 70 is in catch-forming engagement with any one of the holes 66, 67, 68, 69.

If desired, the bottom wall 15 may have a pair of spaced U-shaped rings 102, 103, embedded in and projecting downwardly therefrom for purposes of securing the opposite ends of a shoulder strap (not shown).

In use and operation, the knob 64 is rotated until the appropriate scale 99 corresponding to the type of film used in the camera appears in registration with the opening 100. With the diffusing disc 29 covered or otherwise exposed to darkened conditions, the position of the galvanometer needle 39 can be checked to see if it corresponds to the zero mark m on the scale 99. If this does not occur, it is merely necessary to rotate the zero adjustment screw 43 until the galvanometer needle 39 is in alignment with the zero mark m. In this connection, it should be noted that the zero adjustment marks m on the scales 99 will always lie in the same position when any one of the scales 99 is in registration with the aperture 100 so that ordinarily it is not necessary to change the zero adjustment of the galvanometer needle 39 each time a new scale 99 is used. The light meter A is then aimed at the particular object to be photographed allowing light reflected therefrom to impinge upon the photocell 24 to move the galvanometer needle 39 across the scale 99. The particular aperture opening or EV setting can then be read directly off of the scale 99 in accordance with the position of the galvanometer needle 39. In case the scale is calibrated in aperture openings, the scale may also indicate the selected shutter speed at which such aperture openings are to be used. In accordance with conventional procedure, it is apparent that if a higher or lower shutter speed is used, it is merely necessary to adjust the aperture opening of the camera a sufficient amount to compensate for whatever other shutter speed is desired.

Figure 10:
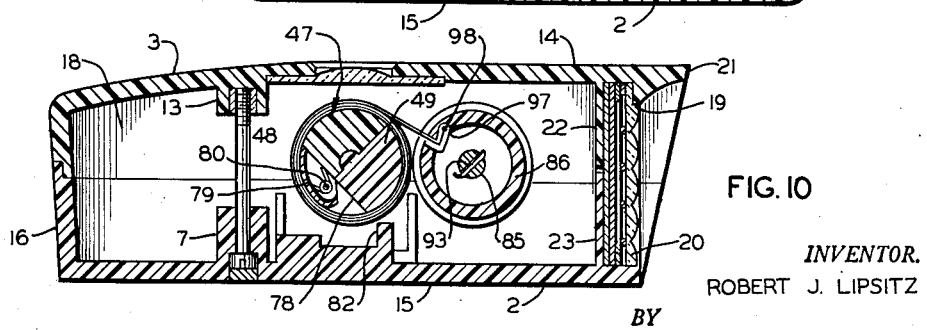
FIG. 10 is a sectional view similar to FIG. 3 and showing the strip in its farthest position of travel in its other direction.

As the knob 64 is turned to select the appropriate scale the roller 47 will rotate in unison with the knob 64 and cause the gear 95 to drive the gear 94. As the roller 47 rotates counterclockwise, from the position shown in FIG. 3 to that shown in FIG. 10, the stop member 79 will move out of contact with the stop abutment 82 and upon continued rotation of the roller 47 the strip 76 will press the stop member 79 inwardly toward the flat surface 78 and hold it in its retracted position as shown in FIG. 10. Upon continued rotation of the roller 47 the strip 76 will be progressively wound thereon, and at the same time be unwound from the roller 86, causing the scales 99 to successively pass in registration with the opening 100. In this connection, it should be noted that as the strip 76 winds on the roller 47 and unwinds from the roller 86, the rotation of the gear 94 will transmit driving force from the shaft 85 to the roller 86 through the spring 92. The relative speeds of the two rollers 47, 86, will continuously change, but at the same time the relative speeds of rotation of the gears 94, 95, will remain constant. Consequently, as the roller 86 moves progressively faster it will be angularly rotated on the shaft 85 relative to the gear 94 and energize the spring 92, thereby preventing the mechanism from becoming jammed. Furthermore, the energy in the spring applies tension to the strip 76 so that it will always remain snugly wrapped around the rollers 47, 86. When the strip 76 is fully wound on the roller 47, as shown in FIG. 10, the strip 76 will cease movement since further rotation of the knob 64 will merely apply tension to the strip 76 which, in this position, extends somewhat radially outwardly of the roller 86. Since the end of the strip 76 is firmly secured in the slit 97 and, furthermore, since the strip 76 is relatively strong, it will not become torn or separated from the roller 86. Upon clockwise rotation of the knob 64 the strip 76 will pay off of the roller 47 and wind on the roller 86 and the roller 47 will gradually decrease its speed of rotation relative to the speed of rotation of the roller 86, allowing the tension in the spring 92 to gradually release some of its energy and rotate the roller 86 relative to the gear 94. When the strip 76 approaches the position shown in FIG. 3, it will release the stop member 79, allowing the spring 81 to bias the stop member 79 outwardly so that further clockwise movement of the roller 47 is prevented by the engagement of the stop member 79 with the abutment 82. Also, when the strip 76 and rollers 47, 86, are in the position shown in FIG. 3, the spring 92 will still be energized a small amount so as to apply some tension to the strip 76. In initially assembling the rollers 47, 86, within the case 1 the roller 86 may be rotated a slight amount with respect to the gear 94 to pre-energize the spring 92 a sufficient amount so that the spring 92 will not be fully de-energized when the rollers 47, 86, are in the position shown in FIG. 3.

In connection with the present invention, it should also be noted that when the strip 76 and rollers 47, 86, are in the position shown in FIG. 3, a portion of the strip 76 is wrapped a little more than a quarter of a turn around the roller 47. Therefore, the stop member 79 prevents the roller 47 from "overwinding," so to speak, which would cause the strip 76 to wind on the roller 47 in the opposite direction the next time the knob 64 is rotated counterclockwise. Consequently, each time the knob 64 is rotated counterclockwise so as to draw the strip from the roller 86, the upwardly presented surface of the strip on which the scales 99 are imprinted will always be exposed to view through the opening 100.

It should be understood that changes and modifications in the form, construction, arrangement, and combination of the several parts of the photographic light meters may be made and substituted for those herein shown and described without departing from the nature and principle of my invention.

Having thus described my invention, what I claim and desire to secure by Letters Patent is:

1. A light meter comprising a first and second rotatable roller, said second roller being rotatably mounted about a shaft, a strip having a plurality of scales imprinted thereon and being attached at its opposite ends respectively to the rollers, said strip being wrapped around said first roller in one direction and around said second roller in the opposite direction, a driving element rigidly connected to said first roller, a driven element engaging said driving element and being coaxial with said second roller, said driven element also being rotatable relative to said second roller, resilient means internally fitted within said second roller and operatively connected to said second roller and driven element so that rotation of the driving element will transmit a first driving force to said other roller through said resilient means and a second driving force to said second roller through said strip, means for rotating said driving element and thereby move said strip so that any one of said scales can be shifted to a predetermined operative position, and indicator means responsive to light intensity for movement across said selected scale.

2. A light meter comprising a first and second rotatable roller, said second roller being rotatably mounted about a shaft, a strip having a plurailty of scales imprinted thereon and being attached at its opposite ends respectively to the rollers, said strip being wrapped around one of said rollers in one direction and around the other of said rollers in the opposite direction, a driving element rigidly connected to said first roller, a driven element engaging said driving element and being coaxial with said second roller, said driving element also being rotatable relative to said second roller, resilient means operatively connected to said second roller and driven element so that rotation of the driving element will transmit a first driving force to said other roller through said resilient means and simultaneously transmit a second driving force to said second roller through said strip, means for rotating said driving element and thereby move said strip so that any one of said scales can be shifted to a predetermined operative position, stop means associated with said one roller for holding said strip and rollers immovable when the selected scale is in operative position, and indicator means responsive to light intensity for movement across said selected scale.

3. A light meter comprising a first and second rotatable roller, said second roller being rotatably mounted about a shaft, a strip having a plurality of scales imprinted thereon and being attached at its opposite ends respectively to the rollers, said strip being wrapped around said first roller in one direction and around said second roller in the opposite direction, a driving gear rigidly connected to said first roller, a driven gear meshing with said driving gear and being coaxial with said second roller, said driven gear also being rotatable with respect to said second roller, resilient means internally fitted within said second roller and operatively connected to said second roller and driven gear so that rotation of the driving gear will transmit driving force to said other roller through said resilient means and simultaneously transmit a second driving force to said second roller through said strip, means for rotating said driving gear and thereby move said strip so that any one of said scales can be shifted to a predetermined operative position, and indicator means responsive to light intensity for movement across said selected scale.

4. A light meter comprising a first roller, a shaft rotatably mounted in spaced parallel relation to said first roller, a second roller rotatably mounted on said shaft, a strip having a plurality of scales imprinted thereon and being attached at its opposite ends respectively to the rollers, said strip being wrapped around one of said rollers in one direction and around the other of said rollers in the opposite direction, a driving gear rigidly mounted on said first roller, a driven gear meshing with said driving gear and being rigidly mounted on said shaft, a spring mounted on and connected to said shaft, said spring also being connected to the second roller so that rotation of the driving gear will transmit driving force to the second roller through the spring, means for rotating said driving gear and thereby move said strip so that any one of said scales can be shifted to a predetermined operative position, and indicator means responsive to light intensity for movement across the selected scale.

References Cited in the file of this patent

UNITED STATES PATENTS

| | | |
|---|---|---|
| 511,470 | Stone | Dec. 26, 1893 |
| 1,366,182 | Hokanson | Jan. 18, 1921 |
| 2,550,936 | Poirette | May 1, 1951 |
| 2,648,254 | Stimson et al. | Aug. 11, 1953 |
| 2,669,155 | Brow | Feb. 16, 1954 |
| 2,714,329 | Pfaffenberger | Aug. 2, 1955 |
| 2,837,839 | Fernbach | June 10, 1958 |
| 2,854,198 | Lubkin et al. | Sept. 30, 1958 |